No. 805,438.　　　　　　　　　　　　PATENTED NOV. 28, 1905.
L. BELL.
BIFOCAL LENS.
APPLICATION FILED JUNE 16, 1905.
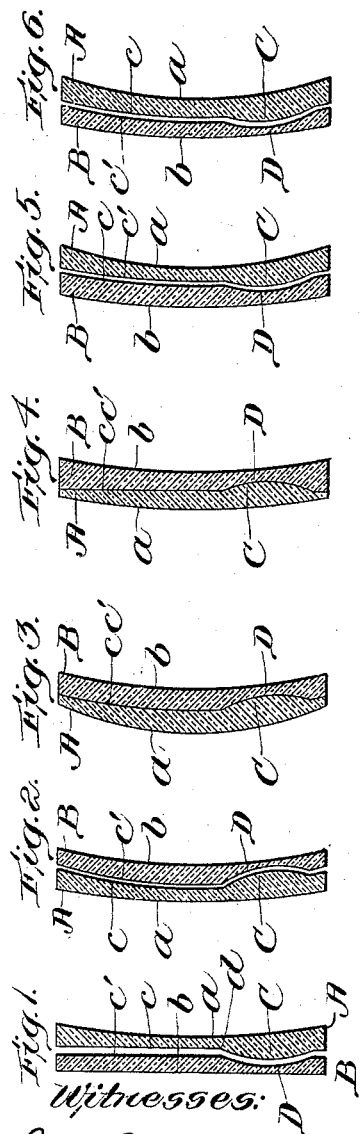
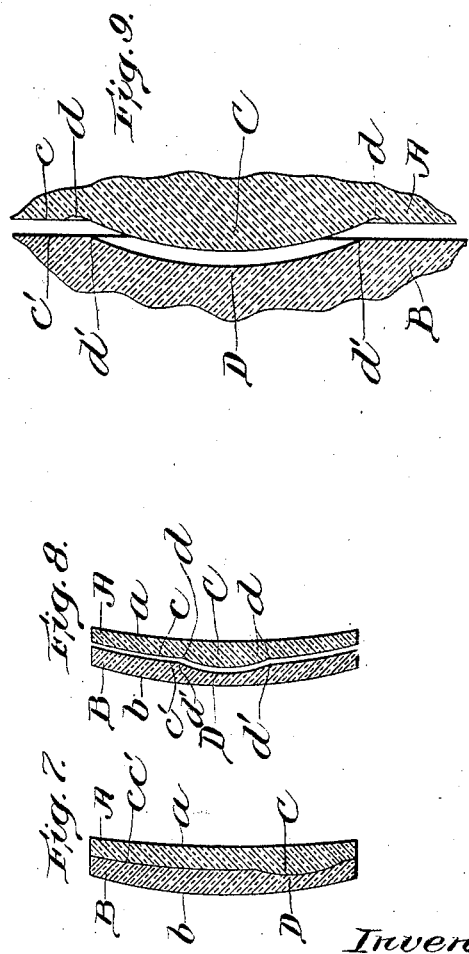

UNITED STATES PATENT OFFICE.

LOUIS BELL, OF BROOKLINE, MASSACHUSETTS.

BIFOCAL LENS.

No. 805,438.      Specification of Letters Patent.      Patented Nov. 28, 1905.

Application filed June 16, 1905. Serial No. 265,516.

*To all whom it may concern:*

Be it known that I, LOUIS BELL, a citizen of the United States, and a resident of Brookline, in the county of Norfolk and State of Massachusetts, have invented new and useful Improvements in Bifocal Lenses, of which the following is a specification.

My invention relates to the construction of bifocal lenses; and it consists in certain structural improvements whereby a bifocal lens may be constructed with the fewest possible number of parts with perfect accuracy and with a minimum of light dispersion and whereby also the lens as a whole presents the appearance of an ordinary single-piece optical lens. The bifocal feature may remain entirely invisible to the observer, although perfectly available to the user.

Bifocal lenses for eyeglasses, spectacles, and the like have been constructed for a long time, and improvements have, so far as I am aware, been for the most part in the direction of introducing bifocal lenses devoid as far as possible of any visible lines of demarcation between the two differentially focal portions of the lens. The original form, which consisted merely of two parts separated horizontally by a clearly-visible line of demarcation, has been for the most part superseded by subsequent improvements, notably such as those in which a supplemental lens is cemented or otherwise secured to the surface of the main lens or in a recess in the surface of the main lens. This expedient produces a bifocal of greatly-improved appearance as contrasted with the lens with the horizontal line of division, but, nevertheless, the line of juncture between the minor and major lenses still remains visible. A later improvement employs not only a supplementary and main lens but a cover-plate of glass, which is cemented to the side of the main lens on which lies the supplementary lens, the said cover portion being cemented with balsam or transparent cement to further conceal the joint between the supplementary and the main lens. In this improvement the bifocal is composed in practice of three parts. The so-called "major" lens itself consists of two pieces joined on a plane surface or whereof one of the two joining surfaces may be convex and the other concave, one or both being suitably recessed at the opposed surfaces to form a cavity, in which is secured an interior lens which has a materially higher refractive index as contrasted with the glass of which the enveloping major lens is composed.

I am aware also that attempts have been made to construct bifocal lenses by grinding a local convexity of shorter radius than the curvature of the lens as a whole upon a selected portion of its surface. Theoretically this should form a perfect bifocal lens in a single piece; but in practice it has been found practically impossible to grind the supplementary lens or local accentuated convexity in such manner that at the geometrical junction between the local convexity and the surrounding surface there shall be a perfect line of juncture. While it is comparatively easy to grind a local concavity in a lens and have the line of junction of this concavity with the surrounding surface perfect, the operation of grinding a local convexity leaves so great marginal aberrations as to be practically impossible for optical purposes.

In the drawings hereto annexed, which illustrate various structural forms which embody my invention, Figure 1 shows in cross-section two parts of a bifocal lens, one being a plano-concave base-lens and the other a plain recessed cover-plate. Fig. 2 shows in cross-section a concave meniscus base-lens with a periscopic recessed cover-plate. Fig. 3 shows in cross-section a convex meniscus base-lens with a periscopic recessed cover, the two parts being shown as cemented together. Fig. 4 shows in cross-section a plano-convex base-lens with a recessed cover-plate having an external cylindrical surface. Figs. 5, 6, 7, and 8 show forms of bifocal lenses whereon the local convexity formed upon the base-lens is developed from a surrounding convex surface, the cover-plate having a correspondingly concave surface with a cavity conforming to the position and curvature of the local convexity of the base-lens. Fig. 9 is a cross-section, on an enlarged scale, showing the manner in which the two portions of my improved bifocal lens are formed and joined.

A is the portion of the bifocal lens which for convenience I term the "base-lens," for the reason that upon this portion A as a base there is formed a local lenticular convexity C, which by reason of its accentuated convex surface as contrasted with the surrounding surface *c* of the base-lens affords the desired local differential optical effect. If it were practically possible to grind a local convexity upon a base-lens with a perfect linear junction therewith, a bifocal lens of ideal simplicity would thereby be constructed. Practically, however, whenever this is attempted the grinding operation inevitably forms a zone of aberrations, as $d$, Fig. 9, around the base of the local convexity C, and this zone, if the lens were employed as a single piece, produces disagreeable and inadmissible dispersions and refractive effects. Such a zone $d$ is shown in exaggerated proportions in Fig. 9. The operation of grinding a local concavity in a surface of a lens such as D is much simpler, the line of junction $d'$ between the local concavity and the surrounding surface $c'$ being to all practical intents geometrically perfect. I therefore select for the two portions of my bifocal lens the base-lens A and the cover-plate B, the base-lens A being of a higher refractive index than the cover-glass B. This difference in indices should be not less than .04, and I recommend, therefore, that in constructing such bifocal lenses this difference of refractive index be observed and, if practicable, a greater difference in refractive index adopted or as high as is consistent with the essential freedom from dispersive effects. Upon the surface of the base-lens A a local convexity C is formed by grinding. As illustrated in Fig. 9, there will be produced the aberration zone $d$ at the line of junction between the local convexity C and the surrounding surface $c$ of the base-lens. Then a cavity D is formed in the surface of the cover-glass B, said cavity being ground as nearly as possible to fit the local convexity C. Here the line of juncture $d'$ can be easily made optically perfect. The general surfaces $c$ $c'$ of the base-lens A and the recessed cover-glass B are ground so as to fit each other whether these two be plane or one concave and the other convex. Then for the adhesive junction of the two parts A and B a balsam or cement is selected which has substantially the same refractive index as the base-lens A, the surface of the said base-lens is covered with the said medium, and the recessed cover-glass joined thereto. By this means the transparent cement, which has the same refractive index as the glass of the base-lens A, fills all local inequalities, such as $d$, and corrects its optical defects, so that the final result is precisely as though the local convexity of the base-lens had been so ground as to leave a perfect line of junction with the surrounding surface. Then, by reason of the difference in refractive indices as between the base-lens A and the cover-glass B, I have, in fact, converted the base-lens A into a perfect bifocal lens in a single piece, the cover-plate performing as its only essential function the office of a cover or inclusive glass which provides in virtue of its accurately ground local concavity a sharp line of demarcation between the body of the base-lens and its enhanced local convexity.

I prefer to form the local convexity upon a base-lens A, which, as shown in Figs. 2 and 3, has a concave surface $c$, for the reason that it will prove easier in practice to grind the local convexity as a development from a concave surface than to develop it from a plane surface, as in Figs. 1 and 4, and even more so than to develop it on a convex surface, as in Figs. 5 to 8, inclusive. Thus in forming a periscopic lens, as in Figs. 2 and 3, the base-lens A has its local convexity developed from a concave surface, while the cover-glass B has its concavity developed from a convex surface, the outer surfaces $a$ $b$ of the base-lens A and cover-glass B being convex and concave, respectively. The skilled maker of optical lenses may readily determine the curvature of the base-lens, cover-glass, and local concavity and its corresponding convexity in order to obtain any desired optical effect. Only two pieces are required to construct bifocal lenses according to this invention, and when in use the contour of the auxiliary lenticular portion will be wholly imperceptible save to the wearer.

In selecting the two portions of the above-described bifocal lenses so that their refractive indices differ by .04 or more, crown-glass may be used for both portions of the lens. This is an advantage which will be appreciated by the manufacturer of optical instruments, for the reason that the employment of ordinary flint glass involves the certainty of enhanced dispersive effects, which offset the value of the high refractive index possessed by different varieties of flint glass.

What I claim, and desire to secure by Letters Patent, is—

1. A lens comprising two portions whereof one has a local convexity and the other a corresponding local concavity, the convexity and concavity juxtaposed.

2. A lens comprising two portions whereof one has a local convexity and the other a corresponding local concavity, the convexity and concavity juxtaposed with a medium between the two portions of the lens, said medium having a refractive index substantially the same as that lens portion on which is formed the local convexity.

3. A lens composed of two portions of different refractive index, one having a local concavity and the other a local convexity which fills the local concavity of the other.

4. A lens composed of two portions of different refractive index, one having a local concavity and the other a local convexity filling the local concavity of the other and in adhesive contact therewith.

5. A bifocal lens composed of two crown-glass portions which differ in refractive index, the one of higher refractive index having a local convexity and the other an opposed local concavity, the two lenses being placed in adhesive contact.

6. A bifocal lens composed of two crown-glass pieces which differ not less than .04 in their respective refractive indices, the one of the said lenses which has the higher refractive index having a local convexity and the other a corresponding opposed local concavity, and a medium, of refractive index substantially equal to that of the lens portion having the greater refractive index, to maintain the two pieces in adhesive contact.

7. A lens composed of two portions of different refractive index one having a local concavity and the other a local convexity opposed to the local concavity, and a cement whereof the refractive index is substantially the same as that of the lens portion which covers said local convexity, to maintain the two pieces in adhesive contact.

8. A bifocal lens composed of two portions one having a local convexity and the other an opposed local concavity of equal radius of curvature to that of the local convexity, and a medium of refractive index substantially equal to that of the portion carrying the local convexity, to cement the two portions together.

9. A bifocal lens composed of a base-lens having a local convexity developed on a surface elsewhere concave and a cover-glass of lower refractive index fitting the compound surface of the base-lens and cemented thereto by a medium of refractive index substantially equal to that of the base-lens.

Signed by me at Boston, Massachusetts, this 15th day of June, 1905.

LOUIS BELL.

Witnesses:
JOSEPH T. BRENNAN,
CHARLES D. WOODBERRY.